UNITED STATES PATENT OFFICE.

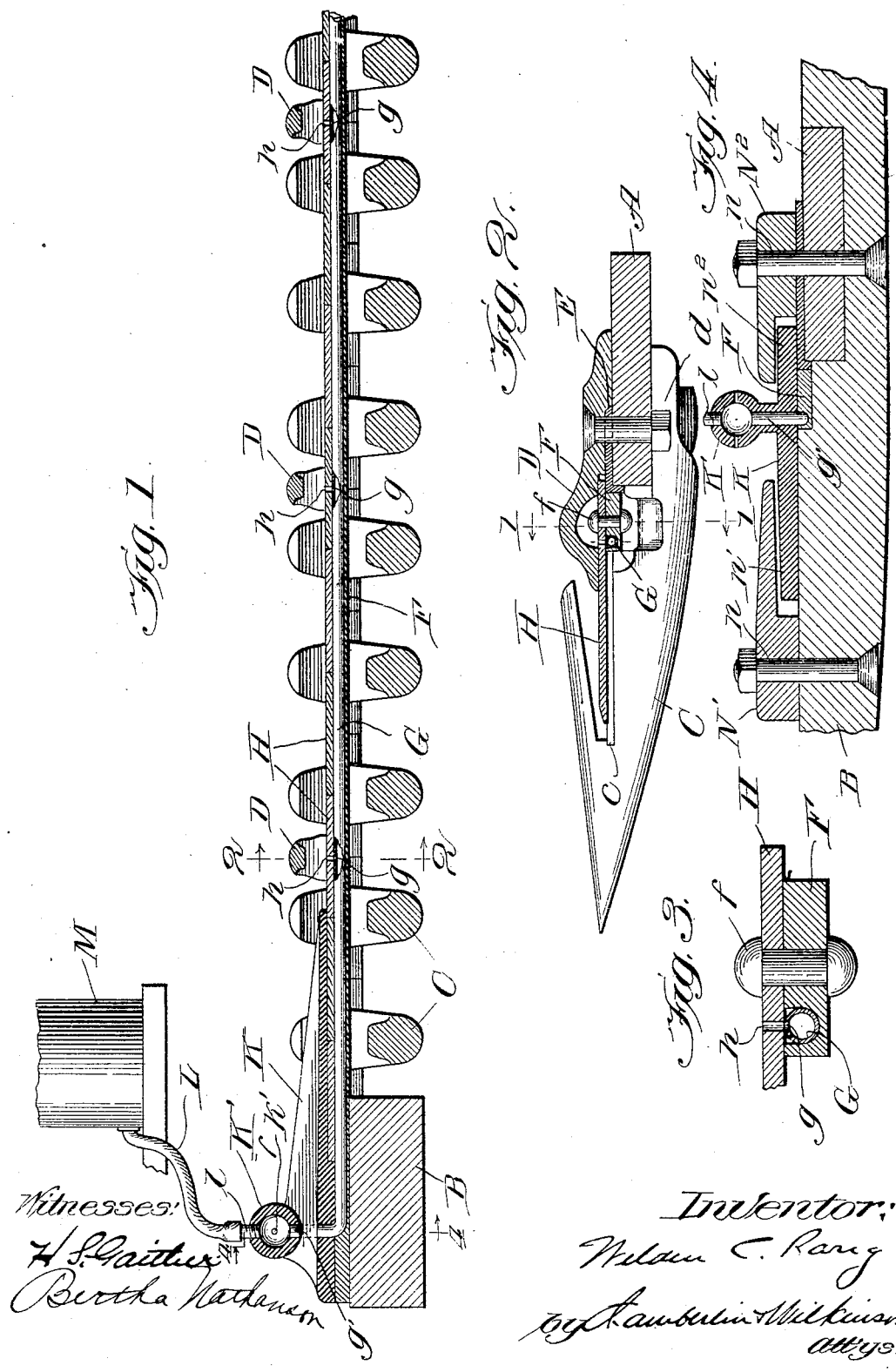

WELDEN C. RARIG, OF OGDEN, UTAH.

MOWER CUTTER-BAR.

No. 805,155.　　　Specification of Letters Patent.　　　Patented Nov. 21, 1905.

Application filed May 4, 1905. Serial No. 258,777.

*To all whom it may concern:*

Be it known that I, WELDEN C. RARIG, a citizen of the United States, residing at Ogden, county of Weber, State of Utah, have invented a certain new and useful Improvement in Mower Cutter-Bars; and I declare the following to be a full, clear, and exact description of the invention, such as will enable others skilled in the art to which it pertains to make and use the same, reference being had to the accompanying drawings, which form a part of this specification.

My invention relates in general to mowers, and more particularly to means for lubricating the reciprocating knives of mower cutter-bars.

In the operation of mowers the reciprocation of the knives or sickles relatively to the cutters-bars wears away the relatively movable parts and also generates friction, which retards the movement of the knives and increases the work imposed upon the machine. When mowers are used for cutting some varieties of grass—such, for instance, as alfalfa—a gum-like substance usually accumulates upon the knives to such an extent as to seriously impede the reciprocation of the knives and materially reduce the cutting efficiency of the knife-sections, thereby necessitating the frequent removal by washing of the accumulated substance.

The primary object of my invention is to provide a mower in which the contacting portions of the reciprocating knife and cutter-bar will be automatically lubricated, thereby reducing the wear and minimizing the work imposed upon the machine.

A further object of my invention is to provide a mower in which water or other lubricant will be automatically discharged between the sections of the knife and the guide-clips engaging the same, thereby removing any matter which would otherwise accumulate and impede the reciprocation of the knife and decimate its cutting capacity.

A still further object of my invention is to provide an improved mower cutter-bar which will be simple and economical in construction and durable and efficient in use.

My invention will be more fully described hereinafter with reference to the accompanying drawings, in which the same is illustrated as embodied in a convenient and practical form, and in which—

Figure 1 is a central longitudinal section on line 1 1, Fig. 2, of a portion of a mower cutter-bar; Fig 2, a cross-section on line 2 2, Fig. 1; Fig. 3, a detailed view on an enlarged scale; and Fig. 4, a sectional view on line 4 4, Fig 1.

The same reference characters are used to designate the same parts in the several figures of the drawings.

Reference-letter A indicates the finger-bar of the mower, which is secured at one end to an inner shoe B of any suitable construction. The outer end of the finger-bar is supported above the ground in any well-known manner, which it is unnecessary to illustrate or describe.

C indicates the guard-fingers of the mower cutter-bar, which are secured to the finger-bar A at predetermined intervals thereon. Each guard-finger is provided with a horizontal channel, through which the knife reciprocates. The guard-fingers C are provided with guard-plates $c$, above which the sections of the knife reciprocate and which cooperate therewith to cut the grass.

F indicates the knife-bar of the sickle or knife, to which are secured cutting-sections H. Any suitable means may be provided for securing the sections to the knife-bar—such, for instance, as rivets $f$.

Knife-clips D are secured to the finger-bar A at predetermined intervals, and each engages the upper surface of one of the sections H of the knife. Suitable means—such, for instance, as bolts $d$—secure the knife-clips to the finger-bar A. The rear edges of the knife-sections H overlie and engage wearing-plates E, mounted upon the finger-bar A. The inner edge of each wearing-plate E extends downwardly around the inner edge of the finger-bar and engages the vertical inner edge of the knife-bar, as clearly shown in Fig. 2.

A knife-head K is rigidly secured to the inner end of the knife-bar F and bears upon the inner shoe B. The knife-head K is provided with a hollow ball K′, to which is adapted to be secured by suitable clamps (not shown) the end of the pitman-rod, by means of which the sickle or knife is reciprocated.

N′ and N² designate guide-clips, secured by bolts $n$ to the inner shoe B, under which reciprocate flanges $n'$ and $n^2$, projecting laterally from the knife-head K.

The construction above described is well known in the art and is merely described in order that the application of my invention thereto may be disclosed. Any other form of cutter-bar may have my invention embodied therein, the foregoing type being merely described as a convenient one in connection with which to disclose my invention.

Longitudinally of the cutter-bar I provide a conduit for the passage of water or other lubricant from a source thereof to points between the knife-clips and underlying knife-sections. This conduit is preferably formed in the knife-bar and may be merely a groove cut therein, but preferably consists of a tube G, located within a groove in the knife-bar F. The tube G, which constitutes a lubricating-conduit, is provided with holes $g$, extending upwardly therethrough beneath the knife-sections H, which underlie the knife-clips D. Holes $h$, registering with the holes $g$, are formed through the knife-sections H, which underlie and reciprocate beneath the several knife-clips D. The inner end of the tube G extends upwardly above the inner shoe B and communicates with the hollow interior of the ball K'. Any suitable means for supplying the lubricant to the interior of the hollow ball K' may be provided—such, for instance, as a coupling $l$, extending upwardly, with which communicates a pipe (preferably flexible) L. The end of the pipe L communicates with a reservoir M for a lubricant, which may be supported at any suitable point upon the mower—such, for instance, as upon the tongue thereof. Holes $k'$ are provided through the side walls of the hollow ball K', so that the lubricant may pass outwardly to lubricate the outer surface of the ball with which the clamps of the pitman-rod engage. The lubricant passing through the holes $k'$ also flows downwardly and lubricates the flanges of the knife-head and their guide-clips, as well as the under surface of the knife-head K, which bears upon the inner shoe B.

The operation of my improvement will be readily understood from the foregoing description and is as follows: The lubricant passes continuously from the reservoir M through the pipe L into the hollow ball K', thence through the conduit G throughout the length of the cutter-bar and is discharged upwardly through the holes $g$ and registering-holes $h$ in the respective knife-sections beneath the ends of the knife-clips D, thereby reducing the friction due to the reciprocation of the knife beneath the knife-clips on the wearing-plates and in the inner shoe. The discharge of the lubricant beneath the knife-clips also serves to continually wash away any substance which may be deposited on the knife-sections and which would impede the motion of the knife-sections beneath the clips and reduce their cutting efficiency.

From the foregoing description it will be observed that I have invented an improved mower cutter-bar, in which is provided a longitudinal lubricating-conduit, which simultaneously discharges a lubricant beneath the several knife-clips, thereby reducing the friction due to the reciprocation of the knife and minimizing the wear upon the relatively movable parts as well as relieving the mower of any unnecessary load. It will be further observed that my improvement insures the free reciprocation of the knife by continually washing away any substance deposited by the grass, which would otherwise accumulate on the sections, retard the movement of the knife-sections beneath the clips, and interfere with their cutting capacity.

Having now fully described my invention, what I claim as new, and desire to secure by Letters Patent, is—

1. The combination with a mower cutter-bar, of a reciprocating knife mounted thereon, clips engaging said knife for guiding the same, a lubricating-conduit extending longitudinally of the cutter-bar, and having passages leading therefrom for supplying a lubricant between the several clips and the knife, means for automatically supplying a lubricant to said conduit.

2. The combination with a mower cutter-bar, of a reciprocating knife comprising cutting-sections, guide-clips located at predetermined points on said cutter-bar and engaging sections of said knife, a lubricating-conduit extending longitudinally of the cutter-bar and having passages leading therefrom for supplying a lubricant between the several clips and the corresponding knife-sections, and means for automatically supplying a lubricant to said conduit.

3. The combination with a mower cutter-bar, of a reciprocating knife comprising cutting-sections, guide-clips, located at predetermined points on said cutter-bar and engaging sections of said knife, a lubricating-conduit beneath the knife-sections extending longitudinally of the cutter-bar and having passages leading therefrom at points below said clips, the knife-sections beneath said clips having holes therethrough with which said passages register, whereby the lubricant is supplied between said clips and the knife-sections engaged thereby.

4. In a mower-knife, the combination with a knife-bar, of cutting-sections secured to said bar, a longitudinal lubricating-conduit in said bar extending beneath said sections, predetermined sections having holes therethrough, communicating with said conduit, whereby the lubricant is supplied from said conduit to the upper surface of said sections.

5. In a mower-knife, the combination with a knife-bar, of cutting-sections secured to said bar, a longitudinal conduit located within said bar and extending beneath said sections, predetermined sections having holes therethrough communicating with holes through said conduit, whereby the lubricant is supplied from said conduit to the upper surface of said sections.

6. In a mower-knife, the combination with a knife-bar of a head secured to the inner end of said bar, a hollow ball on said head to which a pitman-rod is adapted to be connected, a lubricating-conduit communicating with said hollow ball and extending longitudinally within said bar beneath said sections, predetermined sections having holes therethrough, communicating with said conduit, and a supply of lubricant communicating with said ball.

7. In a mower-knife, the combination with a knife-bar, of a head secured to the inner end of said bar, and a hollow ball on said head to which a pitman-rod is adapted to be connected, said ball having holes leading from the interior to the exterior thereof, a lubricating-conduit communicating with said hollow ball and extending longitudinally within said bar beneath said sections, and a supply of lubricant communicating with said hollow ball.

In testimony whereof I sign this specification in the presence of two witnesses.

WELDEN C. RARIG.

Witnesses:
GEO. L. WILKINSON,
M. McDERMOTT.